Oct. 27, 1970 C. S. OTTESON ET AL 3,536,960

HEAT SINK MODULE

Filed June 26, 1968 3 Sheets-Sheet 1

INVENTORS.
CHRISTIAN S. OTTESON
JAMES P. ETTINGER
BY James and Franklin
ATTORNEY

HEAT SINK MODULE

Filed June 26, 1968 3 Sheets-Sheet 2

INVENTORS.
CHRISTIAN S. OTTESON
JAMES P. ETTINGER
BY James and Franklin
ATTORNEY Oct. 27, 1970 C. S. OTTESON ET AL 3,536,960

HEAT SINK MODULE

Filed June 26, 1968 3 Sheets-Sheet 3

INVENTORS.
CHRISTIAN S. OTTESON
JAMES P. ETTINGER
BY James and Franklin
ATTORNEY United States Patent Office 3,536,960

Patented Oct. 27, 1970

3,536,960

HEAT SINK MODULE

Christian S. Otteson, Norwalk, and James P. Ettinger, Ridgefield, Conn., assignors to Electric Regulator Corporation, Norwalk, Conn., a corporation of New York Filed June 26, 1968, Ser. No. 740,264
Int. Cl. H01l 1/12, 1/02
U.S. Cl. 317—100 14 Claims

ABSTRACT OF THE DISCLOSURE

A module adapted to be mounted on an external member which is not necessarily planar carries an electrical element which develops heat and is provided with a heat sink comprising a fixed section rigidly secured to the support elements of the module, and a floating section rigidly secured only to the fixed section, there being no other rigid connection between the floating heat sink section and the module. Each section of the heat sink is placed in intimate thermal conducting relation with a different surface of the electrical element. As a result of this construction, any departure of the external member on which the module is mounted from a planar form will neither develop stresses on the electrical element sandwiched between the heat sink sections nor adversely affect the thermal or electrical connection thereto.

The present invention relates to a module and particularly to a module comprising a heat sink for use in dissipating heat developed by an electrical element forming a part of the module.

In our co-pending application, Ser. No. 702,089, entitled, "Modular Power Supply," and assigned to the assignee of the present invention, we have disclosed a power supply in which the various circuit portions of the power supply are housed within separate modules which are detachably mounted on exposed portions of bus bars provided on an external support wall. When the individual modules are mounted on the bus bars, appropriate electrical connections are made between the electrical elements in the modules, and the external power supply circuitry. The detachable connection between the module and the external support wall may be advantageously made by a quickly detachable connector such as that described and claimed by us in our co-pending application, Ser. No. 683,390, entitled, "Captive Nut Assembly," also assigned to the assignee of this application.

A typical module utilized in a power supply of this type includes an electrical element such as a rectifier. During the operation of the rectifier, the semiconductor junction develops heat, and if means are not provided for dissipating the heat so generated, the semi-conductor material would be damaged. To prevent this, a heat sink is commonly employed to dissipate the heat developed by the silicon rectifier to the surrounding area. The heat sink may be formed of two sections, each comprising a plurality of connected fins. Each section of the heat sink is normally placed in thermal (and, if desired, electrical) conducting relationship with a different surface of the electrical element and is rigidly connected to the insulated module proper. Spaced portions defining module support elements extend from each section of the heat sink, those support elements being mounted on (and, if desired electrically connected to) securing elements on the bus bars carried by the external support wall. (When such electrical connection is made, the sections of the heat sink serve to conduct electrical energy to and from the electrical element.)

It has, however, been found that due to the tendency of the support wall to deviate from a perfectly planar configuration, precise alignment between the securing elements on that wall and the support elements of the module is destroyed, thus tending to misalign the heat sink sections. This either adversely affects the thermal and electrical connection between heat sink sections and electrical element or produces excessive pressure on the electrical element depending on the direction of misalignment. In either case the results are undesirable.

It is a prime object of the present invention to design a module which avoids these disadvantages, but which instead provides heat sink sections which engage the electrical element involved in a fashion which is optimized mechanically, thermally, and, if desired, electrically even though the external support wall on which the module is mounted departs markedly from a planar condition.

It is a further object of the present invention to provide such a module in which ease and security of attachment goes hand-in-hand with sturdiness of construction and adaptability to varying mounting conditions.

To accomplish these results, in accordance with the present invention, we provide that one section of the heat sink is rigidly connected to its support elements, in known manner, while the other section of the heat sink is a "floating" section connected only to the fixed section, and when electrical conduction by the heat sink section is involved, connected to its associated support element only by means of an electrical conductor which is flexible. In this manner, even if the support elements on the module and the corresponding securing elements on the support wall are not in precise alignment due to the non-planar form of the wall, the support element associated with the floating heat sink section may be properly engaged with the corresponding securing element on the support wall without causing stresses on or relative movement of the heat sink sections. Hence, substantially no stresses are produced on the electrical control device and the two heat sink sections remain in the required intimate thermal and electrical contact with the electrical element. The heat sink sections are secured to one another, in an exemplary embodiment of the invention, by clamping means comprising a pair of securing members placed against said sections and connected to one another by fastening elements. The securing members also serve to urge each of the heat sink sections into intimate thermal and electrical contact with the appropriate surfaces of the control element which is sandwiched therebetween.

To accomplishment of the above, and to such other objects as may hereinafter appear, the present invention relates to the construction and arrangement of a module as defined in the appended claims and as described in this specification, taken together with the accompanying drawings in which:

INTRODUCTION

Figures 1, 7:
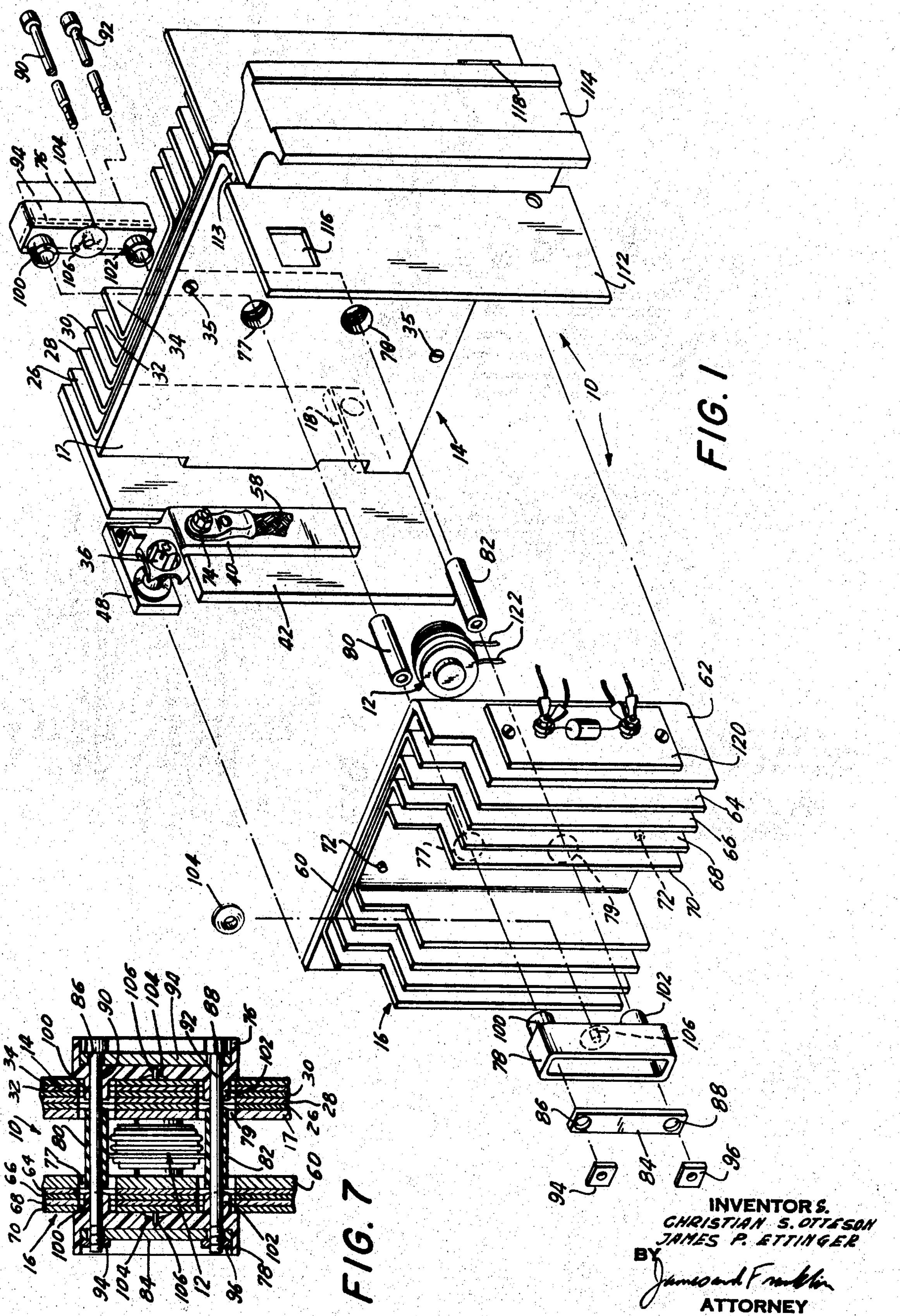
FIG. 1 is a perspective, exploded view of a rectifier module illustrating elements of the heat sink of the present invention.
FIG. 7 is a partial cross-sectional view taken along line 7—7 of FIG. 2.

A module designated generally 10, and herein specifically disclosed as being in the form of a module for use in a power supply, has as its main purpose the incorporation therein of an electrical element. Such an element usually develops heat during its use. As specifically shown herein, the electrical element is a silicon controlled rectifier 12, although it will be understood that is is solely for purposes of illustration, and that the present invention may be used to equal advantage with a rectifier, transistor or other element having the above mentioned heat developing characteristic.

To prevent the heat developed by the control element from damaging the material of the element, means must be provided to dissipate this heat into the surrounding atmosphere. This is usually done by means of a heat sink (here designated 14 and 16), which in previously known modules generally comprises two similarly formed sections, placed in intimate thermal contact with the opposing end conducting surfaces of the electrical element 12.

In known modules of this type, such as that disclosed in our co-pending application, Ser. No. 702,089, each section of the heat sink is electrically conductive, electrically engages a terminal of the electrical element and carries a support element which is adapted to be rigidly mounted on a bus bar or similar conducting element, fixedly mounted on an external support wall of the power supply. In this manner the module is mounted in the power supply and the appropriate electrical connections are made to the electrical element housed in the module.

The support elements provided in the module generally engage mating securing elements provided on the support wall so as to effect the mounting of the module on the bus bars. It is of importance that the electrical conduction between the module support elements and the bus bars be optimized to maintain minimum energy losses in the conduction paths to the module and to minimize the heating developed at the module and bus bar connections. For this reason the support elements of the module are pressed against the bus bars to maintain this optimum conducting relationship.

The bus bar surfaces on which the module support elements are mounted ideally are planar, so that the support elements and the heat sinks connected thereto are properly aligned and unstressed. In practice, however, that nominal planar form is not attained, for example, because of initial manufacture, distortion arising from installation, or warping from age or heat.

This deviation from a planar form develops transverse forces in the heat sink sections which will either move the heat sink sections outwardly away from one another, and thus away from the desired intimate thermal and electrical contact between them and the conducting surfaces of the electrical element, or inwardly towards one another, so that harmful stresses will be developed on the material of the electrical element. These stresses, if of sufficient magnitude and duration, will eventially destroy the usefulness of the electrical element.

THE PRESENT STRUCTURE

In accordance with the present invention, the desired electrical contact between the support elements and the bus bars is maintained, and the electrical element is substantially completely unaffected by the departure of the support wall from planar shape, by providing that only one section of the heat sink, namely a fixed section 14 as disclosed herein, is mounted to the module in the conventional manner described above, the other section of the heat sink being a "floating" section, designated 16, connected only to the fixed section 14 and to the electrical element 12, but not rigidly connected to either the bus bar or to its associated support element. Sections 14 and 16 may be comprised of a plurality of formed sheet metal parts or may be extruded, cast or machined.

As herein specifically illustrated, fixed section 14 comprises a metal plate 17 having at one end an outwardly turned foot 18 defining one support element. A bus bar 20 is fixedly mounted on a rigid back support wall 22 of a control panel, insulated therefrom by insulating member 24. The foot or support element 18 is adapted to be mounted on the bus bar 20. Fixed section 14 further comprises a plurality of generally U-shaped fins 26, 28, 30, 32, and 34, which are secured to one another and to plate 17 by means of screws 35. Foot 18 carries a captive nut assembly 36 which is adapted to rigidly engage a securing element 38 secured to support wall 22 so as to detachably mount fixed section 14 onto bus bar 20. The construction of captive nut assembly 36 is described more completely in our co-pending application, Ser. No. 683,390 and will, therefore, not be further discussed herein.

A plate 40 is mounted on a rigid insulating body 42, a leg 44 of member 17 being rigidly secured to body 42 by means of fastening screw 46. The body 42 thus serves to physically and electrically separate foot 18 from plate 40, a cutout 43 being formed in body 42 through which foot 18 of member 17 passes. Plate 40 has an extending foot 48 defining the second support element of the module, the foot 48 carrying a second captive nut assembly 36 which engages securing means 52 extending from wall 22 to rigidly but detachably press foot 48 against but bar 54, which is, in turn, insulated from wall 22 by insulator member 56.

Floating heat sink section 16 comprises a metal plate 60 bent outwardly at one end to form a leg 62, and further comprises generally U-shaped fins 64, 66, 68, and 70 secured to one another and to plate 60 by means of screws 72. Plate 60 carries a terminal 73 which is electrically connected to a terminal 74 on plate 40 by means of a flexible connector cable 58, cable 58 thus serving as the means for electrically connecting the floating section 16 to plate 40 and thus to bus bar 54.

The floating section 16 is physically connected to the fixed section 14 by means of a clamping device which comprises a pair of substantially identical, hollow, trough-shaped insulating members 76 and 78, which are respectively centrally placed against the surfaces of fins 34 and 70. Pairs of openings are provided in members 76 and 78, which are in respective alignment with openings 77 and 79 provided in the heat sink sections 14 and 16, respectively, and a pair of hollow, cylindrical insulated sleeves 80 and 82 are provided intermediate fixed and floating heat sink sections 14 and 16 which serve to electrically insulate the heat sink sections from one another.

Backing plates 84 having openings 86 and 88 in respective alignment with the openings 77 and 79 provided in sections 14 and 16 are received in members 76 and 78. A pair of fastening screws 90 and 92 is passed through the aligned openings in plates 84, 86, members 76, 78, sections 28, 58, and spacers 80, 82; and a pair of nuts 94 and 96 is tightly screwed onto the free ends of screws 90 and 92 extending through plate 84. Each member 76 and 78 is provided with hollow, cylindrical bosses 100 and 102, which are inserted through openings 77 and 79, respectively in each of sections 28 and 50. It is essential for optimum operation of the module that the surfaces 17 and 60 of the heat sink sections 14 and 16, respectively, be in intimate engagement with the entire conducting surfaces of the electrical element 12. To insure the establishment of this type of engagement between the heat sink sections 14 and 16, and the surfaces of the electrical element 12, even when these surfaces are not parallel, which is often the case, a ball socket 104 is pivotally mounted on a pin 106 extending from a spherical cavity formed in the inner surface of members 76 and 78, that is on those surfaces which lie against the heat sink sections. This construction allows each heat sink section to be slightly swiveled until the desired engagement between the heat sink sections and the surfaces of the electrical element is effected.

Figures 2, 3, 4:
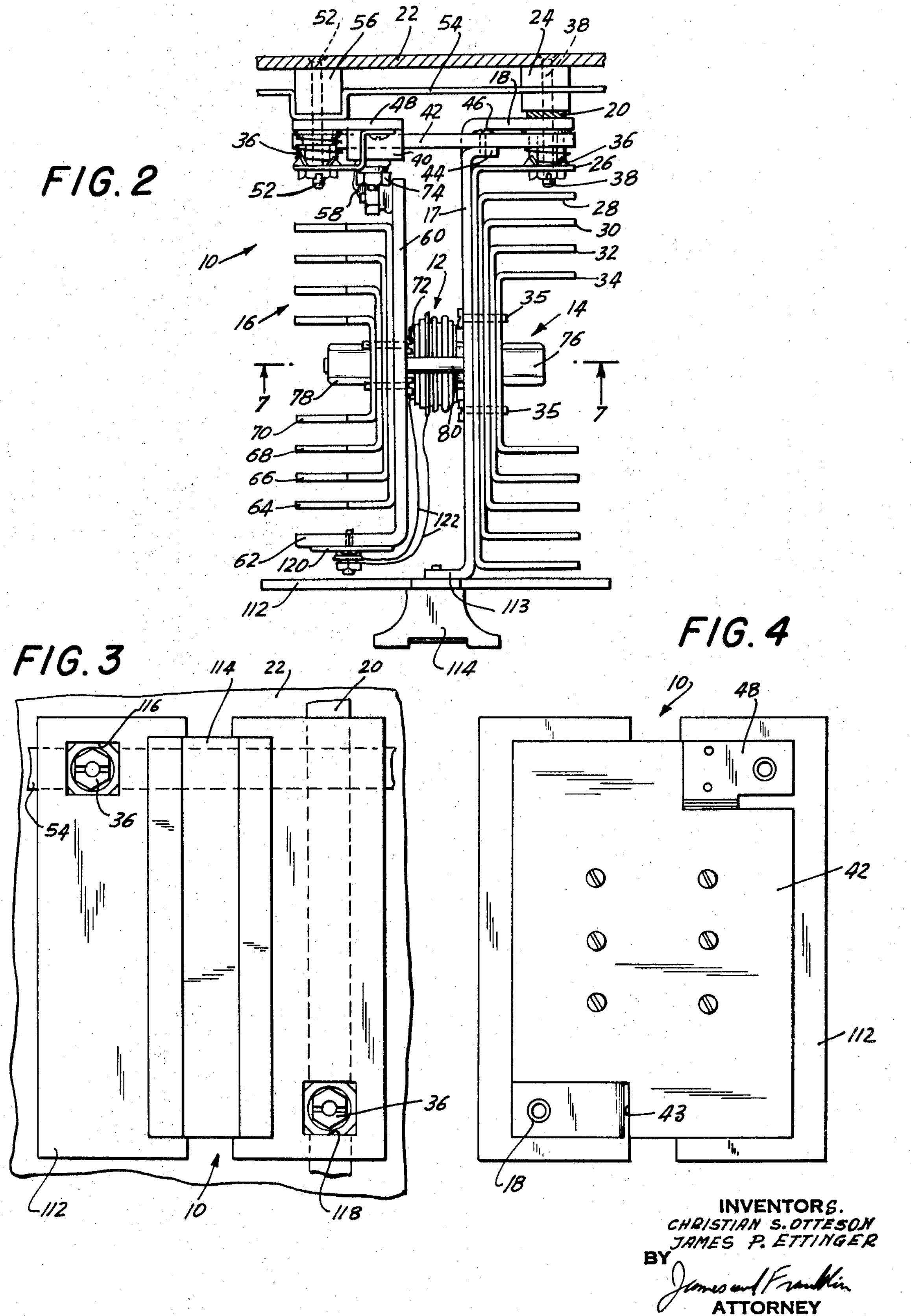
FIG. 2 is a top plan view of the assembled module, including the heat sink of the present invention.
FIG. 3 is a front view of the module of FIG. 2.
FIG. 4 is a rear view of the module of FIG. 2.
Figure 5:
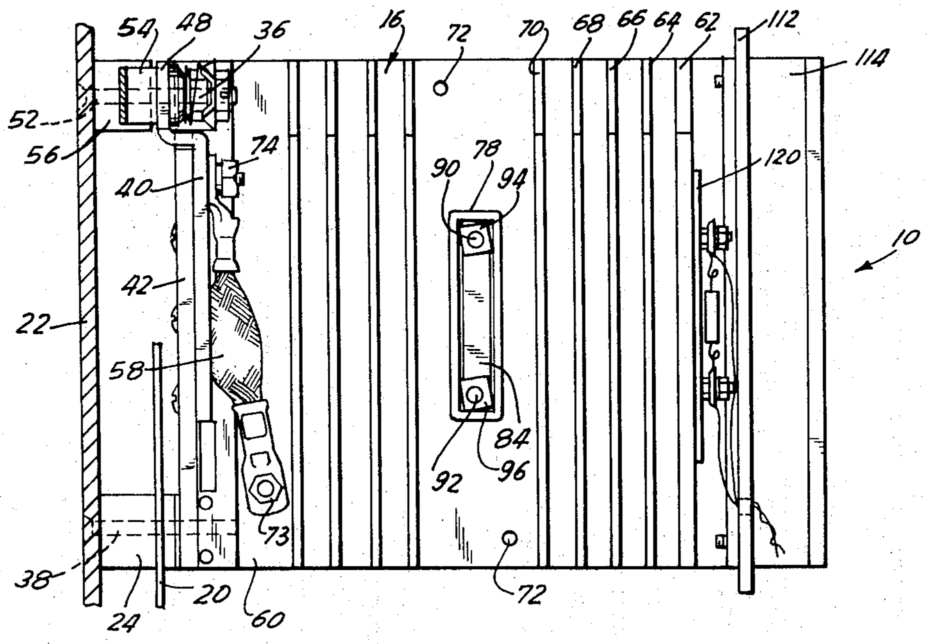
FIG. 5 is an elevational view as seen from the left side of FIG. 3.
Figure 6:
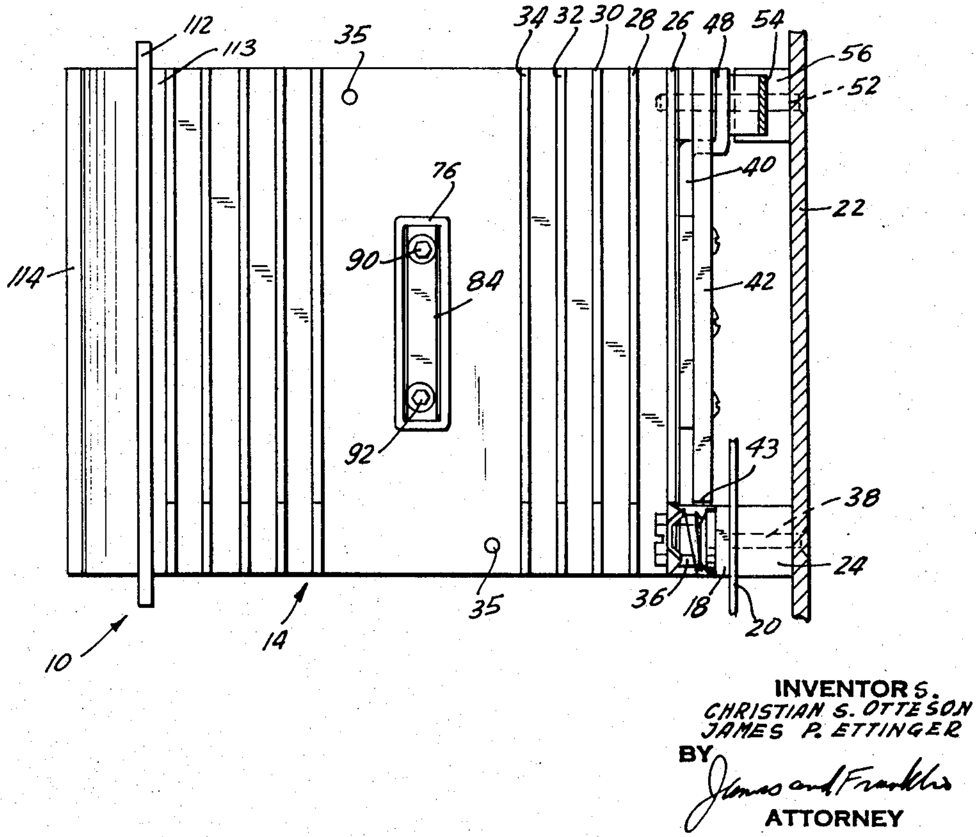
FIG. 6 is an elevational view as seen from the right side of FIG. 3.

As may best be seen in FIGS. 2 and 7, when fixed section 14 and floating section 16 of the heat sink are connected to one another in spaced relation by means of the clamping device, the conductive plates 17 and 60 of each section are pressed into intimate thermal and electrical contact against the opposing end conducting surfaces of the electrical element 12. Furthermore, the floating assembly 16 is securely physically connected only to the fixed assembly 14. Electrical connection between floating section 16 and its associated support element or foot 48 is provided by means of flexible cable 58. The bosses 100 and 102 and the end portions of the insulating sleeves 80 and 82 pass into the openings 77 and 79 in the heat sink section 14 and 16. As a result effective electrical insulation between the two heat sink sections is achieved.

Thus, when the support elements 18 and 48 of module 10 respectively engage the securing means 38 and 52 provided on support wall 22 so as to detachably mount the module 10 on the support wall, and the wall 22 deviates from a planar configuration, this deviation will not force the heat sink sections to move relative to one another. As a result, no harmful stresses will be developed on the electrical element 12, nor will the heat sink sections be moved out of their desired thermal and electrical contact with the conducting end surfaces of element 12.

Preferably, and as here specifically disclosed, module 10, is provided with a front plate 112 secured to leg 113 of plate 17 and having a handle 114 extending out therefrom. Windows 116 and 118 are provided in front plate 112 in respective alignment with captive nut assemblies 36 so that an appropriate tool may be readily inserted through the windows to turn the nuts.

If desired, an insulated terminal board such as that designated as 120 may be mounted on leg 62 to which wires 122 from electrical element 12 are connected. If element 12 is a silicon controlled rectifier, wires 112 would conduct the control signal and a reference signal to element 12.

The heat sink section 14 with its support element 18, the insulating plate 42 with its support element 48, the handle 114 and the cover plate 112 define the primary structure of the module, adapted to be clamped to and detached from the external support wall. Stresses incident upon a lack of planar condition in that support wall are taken up by insulating plate 42. The electrical element 12 is sandwiched between heat sink sections 14 and 16, and the pressure thereon is determined exclusively by the clamping means which secures the floating heat sink section 16 to the main heat sink section 14, that pressure is independent of and entirely unaffected by any twisting, tilting or shifting of the support elements 18 and 48 relative to one another. Thus, no destructive forces are exerted on the electrical element, nor is the efficacy of the thermal and electrical connection of the heat sink elements adversely effected, whatever the mounting condition of the module.

While only a single embodiment of the present invention has been herein specifically disclosed, it will be apparent that many variations may be made thereto without departure from the scope of the invention as described in the following claims.

We claim:

1. A module adapted to be mounted on and electrically connected to an external member, said external member having the tendency of deviating from a planar configuration, said module comprising a body, a pair of spaced support elements mounted thereon and adapted to engage spaced securing means mounted on said external member, an electrical element on said body having the characteristic of developing heat during the use thereof, means for dissipating the heat developed by said electrical element comprising a fixed section and a floating section, said fixed section being rigidly secured to one of said support elements, means for making electrical connection to said electrical element, and clamp means operatively connected to said sections and effective to connect said floating section to said fixed section, and to urge said floating section and said fixed section into intimate heat-conducting relationship with different surfaces of said electrical element, thereby to permit the mounting of said module on said external member without effecting said electrical element even when said external member deviates from a planar condition.

2. The module of claim 1, in which said clamping means comprise first and second members arranged to the outwardly facing surfaces of each of said sections respectively, and means for connecting said members to one another and for urging said members towards one another, and in which said fixed and floating sections comprise said electrical connecting means and said support elements comprise terminal means, said one support element being electrically connected to said electrical element and a flexible electrical conductor connected between said floating section and said other support element.

3. The module of claim 2, in which said body comprises an insulating plate fixed to and electrically insulating said support elements.

4. The module of claim 3, in which said clamping means comprises insulator means interposed between said floating section and said fixed section.

5. The module of claim 4, in which said members and said floating and fixed sections are each provided with aligned openings, and further comprising member fastening means passing through said openings and securing said members to one another.

6. The module of claim 5, in which said members each comprise projections extending into said openings provided in each of said sections.

7. The module of claim 6, in which a portion of said insulator means extend into said aligned openings in substantial alignment with said projections.

8. The module of claim 2, in which said clamping means comprises insulator means interposed between said floating section and said fixed section.

9. The module of claim 1, in which said fixed and floating sections comprise said electrical connecting means and said support elements comprise terminal means, said one support element being electrically connected to said electrical element, and a flexible electrical conductor connected between said floating section and said other support element.

10. The module of claim 9, in which said body comprises an insulating plate fixed to and electrically insulating said support elements.

11. The module of claim 1, in which said body comprises an insulating plate fixed to and electrically insulating said support elements.

12. The module of claim 11, in which said clamping means comprises insulator means interposed between said floating section and said fixed section.

13. The module of claim 1, in which said clamping means comprises insulator means interposed between said floating section and said fixed section.

14. A module adapted to be mounted on and electrically connected to an external member, said external member having the tendency of deviating from a planar configuration, said module comprising a body, a pair of spaced support elements mounted thereon and adapted to engage spaced securing means mounted on said external member, an electrical element on said body having the characteristic of developing heat during the use thereof, means for dissipating the heat developed by said electrical element comprising a fixed section and a floating section, said fixed section being rigidly secured to one of said support elements, means for making electrical connection to said electrical element, and clamp means operatively connected to said sections and effective to connect said floating section to said fixed section, and to urge said floating section and said fixed section into intimate heat-conducting relationship with different surfaces of said electrical element, thereby to permit the mounting of said module on said external member without affecting said electrical element even when said external member deviates from a planar condition, said clamping means comprising first and second members arranged on the outwardly facing surfaces of each of said sections respectively, and means for connecting said members to one another and for urging said members towards one another, said members and said floating and fixed sections are each provided with aligned openings, and further comprising member fastening means passing through said openings and securing said members to one another, said clamping means comprising insulator means interposed between said floating section and said fixed section, and said members each comprising projections extending into said openings provided in each of said sections.

References Cited

UNITED STATES PATENTS

| | | | |
|---|---|---|---|
| 2,759,133 | 8/1956 | Mueller | 317—234 |
| 3,372,733 | 3/1968 | Callender | 317—234 |
| 3,187,087 | 6/1965 | Katz et al. | 317—100 X |
| 3,226,466 | 12/1965 | Martin | 174—15 |

FOREIGN PATENTS

| | | |
|---|---|---|
| 1,452,980 | 9/1966 | France. |

LARAMIE E. ASKIN, Primary Examiner

G. P. TOLIN, Assistant Examiner

U.S. Cl. X.R.

317—234